(12) United States Patent
Alexander et al.

(10) Patent No.: US 9,311,417 B2
(45) Date of Patent: Apr. 12, 2016

(54) PERSONALIZED NAVIGATION SHORTCUTS

(75) Inventors: Jeffrey H. Alexander, Arlington, MA (US); Karl R. Haberl, Tyngsboro, MA (US); Stephen J. Green, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 247 days.

(21) Appl. No.: 13/415,979

(22) Filed: Mar. 9, 2012

(65) Prior Publication Data
US 2013/0238783 A1 Sep. 12, 2013

(51) Int. Cl.
| | | |
|---|---|---|
| G06F 17/00 | (2006.01) | |
| G06F 17/30 | (2006.01) | |
| G06F 3/00 | (2006.01) | |
| G06F 3/048 | (2013.01) | |
| G06F 15/173 | (2006.01) | |
| H04L 29/08 | (2006.01) | |
| G06Q 30/02 | (2012.01) | |

(52) U.S. Cl.
CPC .... *G06F 17/30873* (2013.01); *G06F 17/30867* (2013.01); *G06F 17/30899* (2013.01); *G06Q 30/02* (2013.01); *H04L 67/306* (2013.01)

(58) Field of Classification Search
CPC . G06F 17/24; G06F 17/211; H04L 29/08072; H04L 29/06; H04L 29/06027; H04L 29/08144; G06Q 10/10
See application file for complete search history.

(56) References Cited

U.S. PATENT DOCUMENTS

| | | | |
|---|---|---|---|
| 6,308,188 B1 * | 10/2001 | Bernardo et al. | 715/234 |
| 6,981,040 B1 * | 12/2005 | Konig et al. | 709/224 |
| 7,660,815 B1 | 2/2010 | Scofield et al. | |
| 7,774,335 B1 | 8/2010 | Scofield et al. | |
| 8,566,696 B1 * | 10/2013 | Hamon et al. | 715/205 |
| 2001/0043238 A1 * | 11/2001 | Guerrero | 345/853 |
| 2002/0054090 A1 | 5/2002 | Silva et al. | |
| 2005/0132296 A1 * | 6/2005 | Milic-Frayling et al. | 715/745 |
| 2006/0041553 A1 * | 2/2006 | Paczkowski et al. | 707/7 |
| 2006/0085766 A1 * | 4/2006 | Dominowska et al. | 715/854 |
| 2006/0136378 A1 * | 6/2006 | Martin | 707/3 |
| 2006/0136589 A1 * | 6/2006 | Konig et al. | 709/224 |
| 2006/0259867 A1 * | 11/2006 | Watson et al. | 715/760 |
| 2008/0114756 A1 * | 5/2008 | Konig et al. | 707/5 |
| 2008/0148193 A1 * | 6/2008 | Moetteli | 715/854 |
| 2008/0255881 A1 * | 10/2008 | Bone | 705/3 |
| 2009/0006371 A1 * | 1/2009 | Denoue et al. | 707/5 |
| 2009/0043874 A1 * | 2/2009 | Kim et al. | 709/223 |
| 2009/0055179 A1 * | 2/2009 | Cho et al. | 704/246 |
| 2009/0164641 A1 * | 6/2009 | Rogers et al. | 709/227 |
| 2009/0164887 A1 * | 6/2009 | Ikegami | 715/247 |
| 2009/0210806 A1 * | 8/2009 | Dodson et al. | 715/760 |
| 2010/0042953 A1 * | 2/2010 | Stewart et al. | 715/854 |
| 2010/0050067 A1 * | 2/2010 | Curwen et al. | 715/206 |

(Continued)

*Primary Examiner* — Ho Shiu
(74) *Attorney, Agent, or Firm* — Kraguljac Law Group, LLC

(57) ABSTRACT

Systems, methods, and other embodiments associated with generating suggested shortcuts are described. In one embodiment, a method includes identifying a user that accesses an intranet portal and tracking navigation paths taken by the user within the intranet portal. The navigation paths are stored in a user profile associated with the user, where the navigation paths indicate a sequence of visited locations and a destination location for the sequence. When the user visits a location within the intranet portal, a list of suggested destination locations are generated as navigation shortcuts to allow the user to directly access a desired destination.

20 Claims, 5 Drawing Sheets

(56) References Cited

U.S. PATENT DOCUMENTS

| | | | |
|---|---|---|---|
| 2010/0146110 A1* | 6/2010 | Christensen et al. | 709/224 |
| 2010/0161631 A1* | 6/2010 | Yu et al. | 707/758 |
| 2011/0010244 A1* | 1/2011 | Hatridge et al. | 705/14.53 |
| 2011/0289426 A1* | 11/2011 | Sonstegard et al. | 715/745 |
| 2012/0005192 A1* | 1/2012 | Bao et al. | 707/721 |
| 2012/0017269 A1* | 1/2012 | Cahill | 726/9 |
| 2012/0137201 A1* | 5/2012 | White et al. | 715/205 |
| 2012/0166926 A1* | 6/2012 | Kim et al. | 715/207 |
| 2012/0240019 A1* | 9/2012 | Nuzzi | 715/205 |
| 2013/0132851 A1* | 5/2013 | Konopniki et al. | 715/736 |
| 2013/0159824 A1* | 6/2013 | Barak et al. | 715/205 |

* cited by examiner

PERSONALIZED NAVIGATION SHORTCUTS

BACKGROUND

A corporate portal (or enterprise portal) is an internal network (intranet) that integrates, for example, information resources, people, and processes across an organization's boundaries. The portal typically provides a secure unified access point in the form of a web-based user interface where authorized users can access the portal.

A user within the portal will look for resources by navigating through web pages and links. Navigating to a desired resource in the corporate portal involves a series of link/page selections starting at the portal access point and ending several selections later at the desired resource. Typically users visit certain resources on a frequent basis but the user must remember how to reach those resources each time. Creating a bookmark for a particular web page or resource may not work in a portal because users are logged into a session which is lost when the user logs out. When a user logs back into the portal, a new session ID is assigned to the user along with newly assigned URLs (uniform resource locators). Thus any previously recorded URL bookmarks (from a different session ID) no longer match the intended location.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems and methods are described herein that generate personalized navigation shortcuts for a user. When a user navigates to a desired resource on a corporate intranet, the navigation frequently involves a series of clicks (e.g., link selections) starting at a portal site and ending, several clicks later, at the desired resource. In one embodiment, a navigation profile is built for individual intranet users that records destination resources/locations visited by the user and the links traveled to get there. The system, through the portal site, can then determine and suggest a list of links that are most likely to be followed after at least a single link in a navigation chain is selected by the user based on their navigation profile. This provides a way for the user to skip right to a desired resource without having to remember the navigation path to reach the desired resource. In other words, the system determines likely destinations of where the user may wish to go based on where the user came from.

Figure 1:
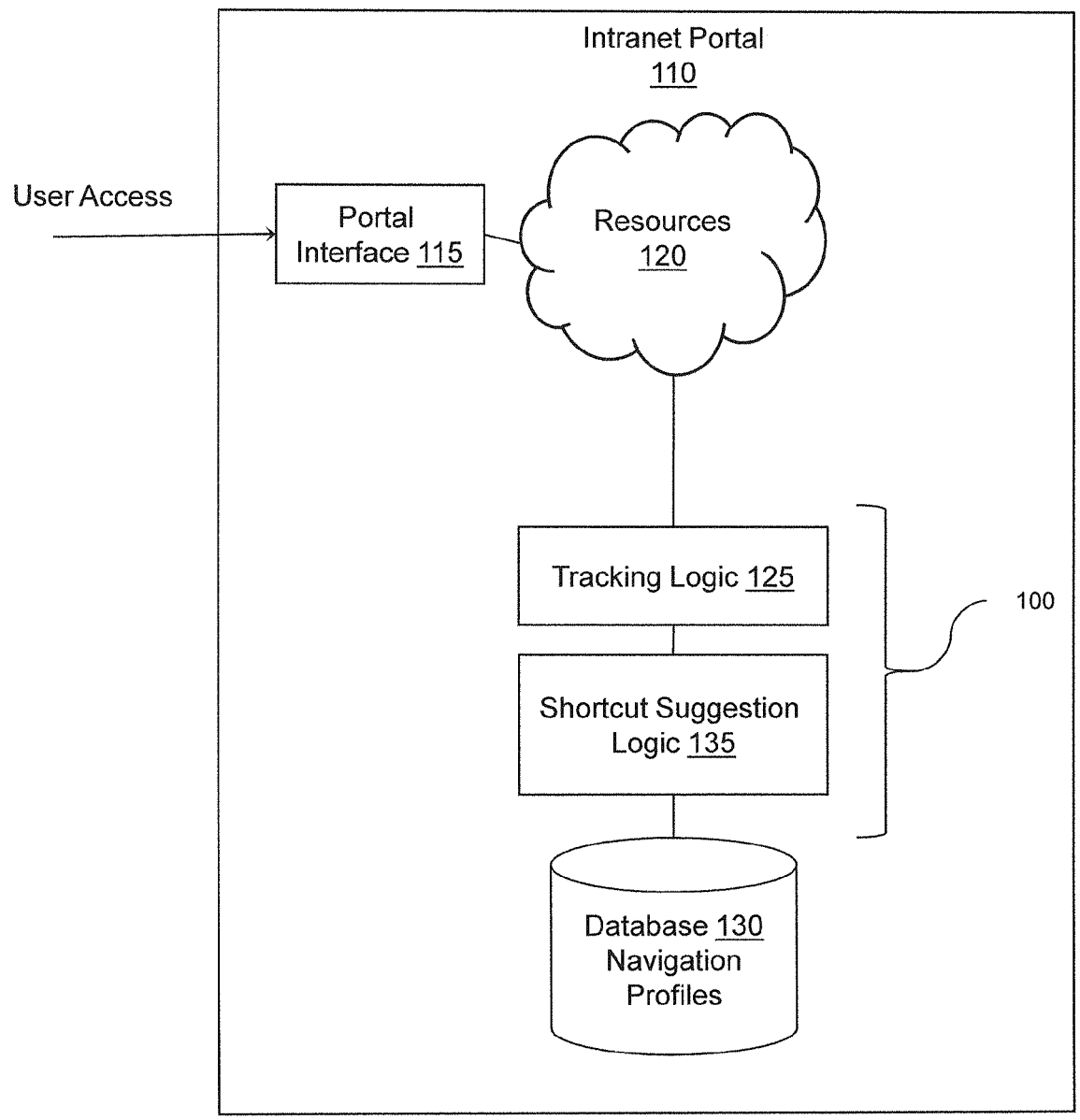
FIG. 1 illustrates one embodiment of a system associated with generating personalized shortcuts.

With reference to FIG. 1, one embodiment of a navigation system 100 is illustrated that is associated with generating personalized navigation shortcuts for users. The navigation system 100 is implemented in a computer system (e.g. a server) that is part of an intranet portal 110 that includes a portal interface 115 and resources 120. The resources 120 are, for example, web pages, links, documents, applications, and so on connected to an intranet of a corporate enterprise. As previously discussed, a user accesses the portal 110 via the portal interface 115 (e.g., a web-based access/log-in page) and can navigate through the portal to locate desired resources using a browser.

The navigation system 100 is configured to build a profile for each user that includes a navigation tracking history of the paths taken by the user. In one embodiment, the navigation system 100 includes a tracking logic 125 that tracks the navigation paths taken by a user and stores the paths in the user's profile. A navigation path is, for example, a sequence of locations/links visited by the user from a starting location to a destination location. The starting location is referred to in this discussion as the root location, which is for example the access point to the intranet portal 110 or a home page after the user logs-in. In general, the starting location is the web page from where a user begins access to the portal 110. The destination location is also referred to in this discussion as a desired resource since the user is assumed to be searching for the desired resource and the navigation path ends once the resource is found. Thus a navigation path includes a sequence of locations e.g., starting location (root)—intermediate visited locations—destination location.

After a user visits the intranet portal a number of times, the user's profile is generated with more navigation data. Each user's profile is stored and maintained in a non-transitory storage device/memory, for example, in a database of navigation profiles 130. In one embodiment, each time the user clicks a link, that navigation step is recorded in the context of the user's browsing session. In another embodiment, each time the user follows the same path (e.g., a previously followed and recorded path), the path is assigned a greater weight in the user's profile relative to other recorded paths.

Once a sample of the user's navigation activity exists in their profile, the navigation system 100 can begin to offer suggestions for the user's most likely destinations based on where in the click path the user is. In this regard, the navigation system 100 includes a shortcut suggestion logic 135 that is configured to provide suggested destination locations to a particular user based on where the user currently is in the portal 110 and how the current path taken matches with the navigation paths stored for the user in his/her profile. An example set of navigation paths stored in a user's profile will be discussed with reference to FIG. 2.

Figure 2:
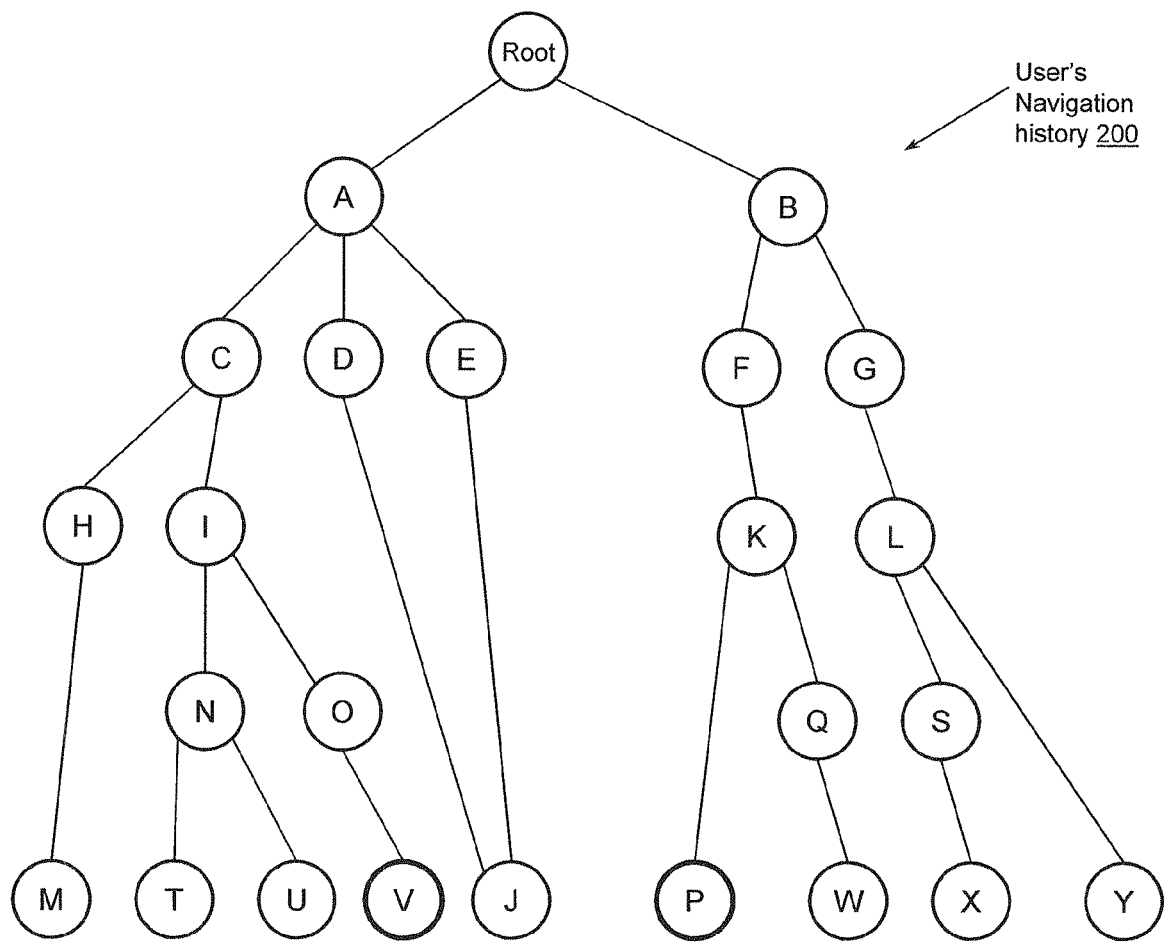
FIG. 2 illustrates one embodiment of navigation history tree.

FIG. 2 illustrates one embodiment of a user's navigation history 200 that may be generated by the tracking logic 125 of FIG. 1. The navigation history 200 is represented as nodes of a tree where each node is a visited location/resource in the intranet portal 100. Connected nodes represent a sequence of clicks and locations visited by the user that end at a destination location (desired resource), which are leaf nodes in the tree (e.g. nodes M, T, U, V, J, P, W, X, Y).

Thus in the example tree in FIG. 2, the user's navigation history paths begin at a root node and end at a number of destination locations. For example, one sequence taken by the user is (root, A, E, J) meaning that the user started at the root location, then visited location A, then location E, and ended at location J. Accordingly, the path (root, A, E, J) is one way for the user to get to and find the desired resource at location J. Of course, an intranet may have many different connections between locations and resources, and many different ways to reach certain resources. And as previously stated, creating a bookmark for a particular web page may not work in the intranet portal 100 because users are logged into a session and the bookmarks are associated with the session. Thus the bookmarks are no longer valid when the user logs-out of the portal. With the navigation system 100, the system stores the paths taken by the user so that the sequence of locations leading to a desired resource is recorded.

With reference again to FIG. 1 and FIG. 2, the shortcut suggestion logic 135 uses the navigation history 200 of a user to provide suggestions for the user's most likely destinations based on where the user is in the click path. For this example, suppose that locations V and P are the most visited resources by the user and have been assigned the greatest weight relative to other destinations. Thus node V and P are shown in bold in FIG. 2. When the user accesses the portal, his/her navigation profile is found and the shortcut suggestion logic 135 generates suggested destinations. For example, when the user is at the root of the portal, the user may simply be presented with, in addition to normal portal content, a list of frequently visited destinations (e.g., highly visited leaf nodes in the tree 200 of all past navigation paths). Here, the shortcut suggestion logic 135 determines that the most likely destinations for the user from the root node are locations V and P (e.g., most weighted locations). The shortcut suggestion logic 135 then displays a list of V and P as shortcut links on a display screen (e.g., in a browser window). The user can then select a link to directly go to the desired resource at V or P rather than having to navigate the entire sequence of locations to reach V or P. In another embodiment, all of the user's destinations can be displayed as suggested destinations when the user enters the portal (e.g., all leaf node locations from the tree 200 are displayed).

Figure 4:
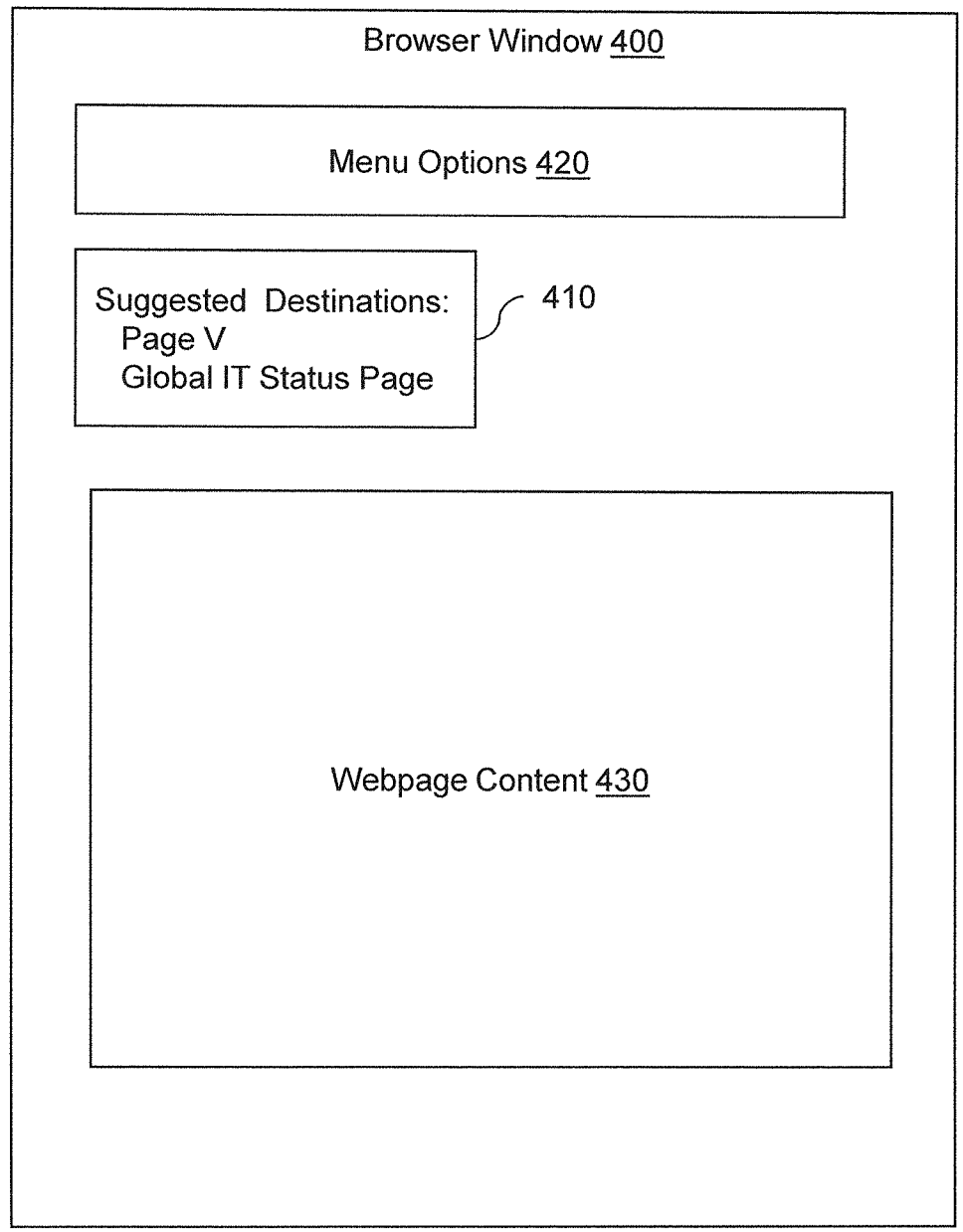
FIG. 4 illustrates an embodiment of browser window with suggested destinations displayed.

If the user does not select the displayed shortcut links but instead proceeds to another web page, for example, page "A", then the suggestion logic 135 recalculates the suggested destinations and prunes out other branches of the tree 200 that are no longer possible destinations. Thus, all branches under the "B" node are pruned from being potential destinations. When the user is at page A, the most likely destination is "V" based on weight assignments in the user's profile 200. A shortcut to location V is displayed to the user as the most likely destination. In one embodiment, a suggestion message may be displayed for example, "When you click on page A, you frequently are trying to reach resource V." The user can then directly visit resource V by clicking the displayed shortcut and avoid having to remember how to reach V (e.g., via pages A, C, I, O, V as shown in FIG. 2). One example of a displayed list of suggested destinations is illustrated in FIG. 4. FIG. 4 shows one embodiment of a display screen having a browser window 400 and a display portion 410 that displays "Suggested Destinations" including "Page V" and "Global IT Status Page" as shortcut links. The user can select the shortcut link to directly go to the associated location. The Suggested Destinations 410 are displayed in addition to other menu options 420 that are in the browser window 400 and are displayed in addition to webpage content 430, which is the content of the webpage being visited by the user.

In another example with reference again to FIG. 2, if the user starts at the root and goes to page B in the portal, the current path is (root, B). The suggestion logic 135 matches the current path of (root, B) to the user's navigation history 200 to find the possible destinations based on the current path. The leaf nodes under path (root, B) are P, W, X, and Y. Shortcuts to all of these possible destinations can be display or only the ones with the greatest weights may be displayed. Then as the user continues to visit other pages, the list of possible destinations is dynamically updated/recalculated and certain destinations are pruned. For example, if the user moves from page B to page F in the portal making the current path (root, B, F), the navigation history 200 shows that locations X and Y are no longer possible destinations and are pruned from the suggested list. Locations P and W only remain as possible destinations and their shortcuts are displayed to the user.

In this manner, the system can suggest likely destinations and their shortcuts to the user as the user visits a web page based on where the user has come from. One embodiment of the process is now described with reference to FIG. 3.

Figure 3:
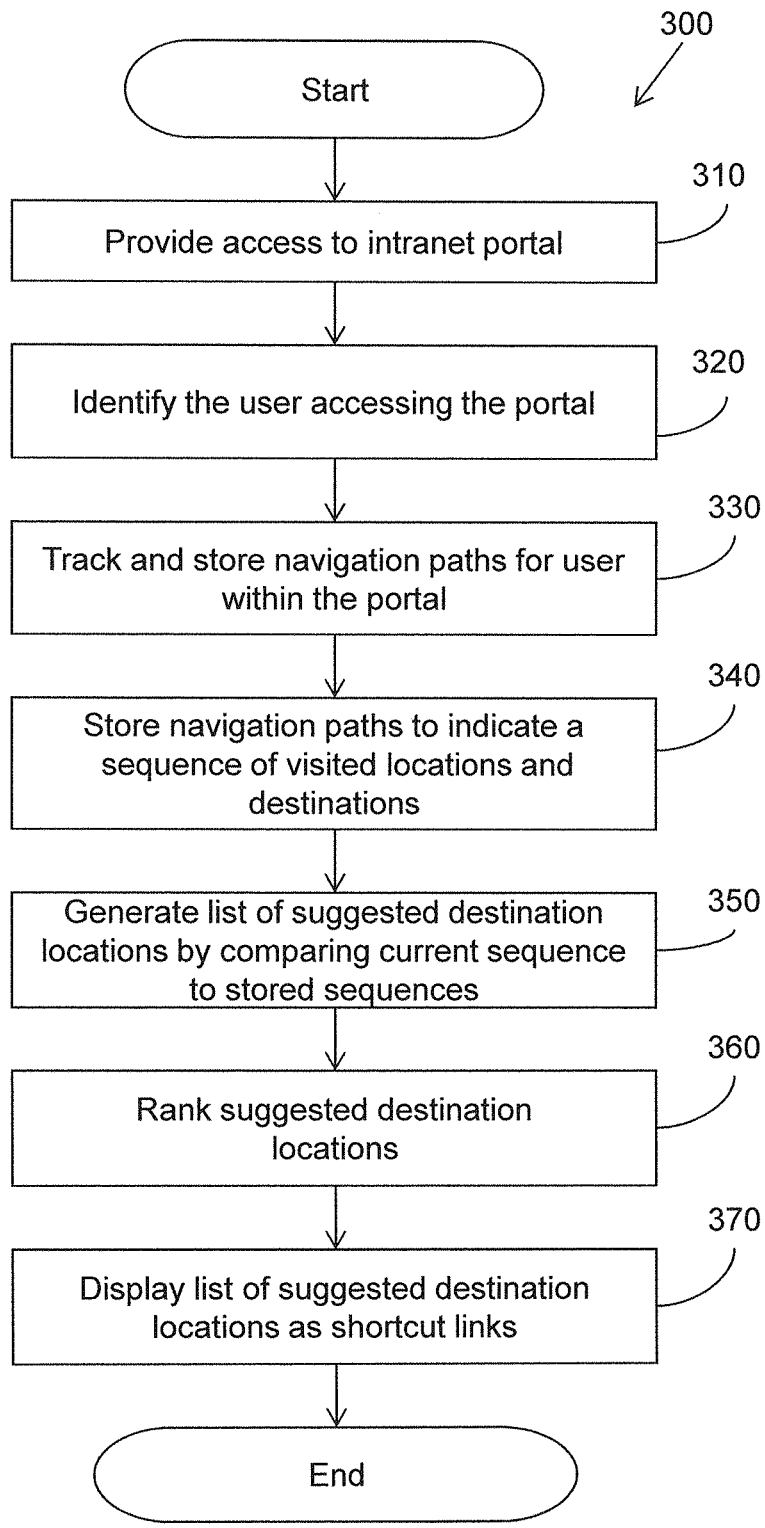
FIG. 3 illustrates one embodiment of a method associated with navigation tracking and generating suggested destinations.

FIG. 3 illustrates one embodiment of a method 300 associated with generating personalized navigation shortcuts for a user. The method 300 will be described in the context of the intranet portal 100 shown in FIG. 1 and refers to the navigation history 200 shown in FIG. 2. In one embodiment, method 300 is computer-implemented and performed by at least a processor that executes stored instructions.

At 310, access to the intranet portal is provided. In one embodiment, this may include a graphical user interface with a log-in page that asks a user to input identification information. The information is used to verify if the user is authorized to access the portal. For example, a user ID and password can be accepted. Once the user identification information is verified, access to the portal is permitted or denied. The portal is for example a corporate enterprise that restricts access to authorized users. For this discussion, access is assumed. At 320, with the user identification information, the method identifies the user for purposes of generating personalized shortcuts. This includes building and/or retrieving a navigation profile for the user. If a navigation profile has not yet been created for the user, then a new profile is regenerated. If a navigation profile already exists, then the profile is updated with new tracking information as discussed below. In one embodiment, this is performed for each user that accesses the portal or can be performed for a selected group of users where individual profiles are maintained for each user in the group.

At 330, as the user navigates to different pages/links in the portal, the method tracks the navigation paths taken by the user. At 340, the navigation paths are stored in a user navigation profile associated with the user. As discussed previously, the navigation paths are stored to indicate at least a sequence of visited locations and a destination location for the sequence. In one embodiment, a tree of links is generated and maintained to record the visited paths of the user. Each branch of the tree represents a path from one location to another location in the portal. In one embodiment, the method may include a function of recognizing patterns of paths taken by the user over time and determining which locations/resources are preferred destinations by the user.

Once a user navigation profile exists for a user, the method can generate suggested destination locations for the user based on the current path taken by the user in the portal (e.g., sequence of visited locations). At 350, when the user visits locations within the intranet portal, a list of suggested destination locations is generated by comparing the current sequence of visited locations with the stored sequences of visited locations from the user navigation profile. The method attempts to identify matching sequences and return the most likely destination locations stored in the user profile associated with the matching sequences. Examples of this type of matching are described with reference to FIG. 2 above.

For example, if the user travels from the root to page B, then the likely destination locations are P, W, X, an Y (see FIG. 2). In other words, the method determines where the user wants to go (suggested destination) based on where the user came from (sequence of visited locations). The method consults the user navigation tree 200 to decide which branches of the tree are most followed by the user and the method determines the most likely destinations for the user's path. At 360, the list of suggested destinations may be ranked based on weights. For example, the suggested destinations may be ranked according to a weight assigned to the path corresponding to the destination or other weighting factor. This is further described in the example below. At 370, the list of suggested destinations is transmitted to a user device and caused to be displayed as shortcut links on a display screen.

Regarding the ranking feature, in one embodiment, weights are assigned to selected branches in the navigation tree 200 and/or to leaf nodes in the tree (destination locations), which are used to rank the suggested destinations. For example, a weight is assigned based on the user's frequency of travelling on a path or visiting a resource. The more the user travels on a path (e.g., path A, E, J), the system assigns a greater the weight to the path. In another embodiment, other functions can be used to apply weight. For example, a log function can be applied so that the weighting is not linear. In this manner, one highly visited path or location does not get over weighted relative to the other paths. Another function may consider user attributes and/or characteristics to apply a weight to a path or resource. For example, suppose a user has an attribute that he works in the payroll department. Thus portal resources associated with the payroll department may be given higher weights when visited by the user.

In one embodiment, the described methods and/or their equivalents are implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method. The described methods represent one possible algorithm for programming a computer system to perform the described functions. The described methods and/or systems are not mental processes.

In one embodiment, the described methods and/or systems are implemented in a portal server to collect navigation information about users and provided suggestions of destinations. In another embodiment, the described methods and/or systems are implemented in a separate computer from the portal server, for example, as an adjacent service that functions on the portal server. In one embodiment, the navigation system 100 of FIG. 1 is implemented as Javascript that runs in a user's browser to collect and record navigation data.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, fewer than all the illustrated blocks may be used to implement an example methodology. Blocks may be combined or separated into multiple components. Furthermore, additional and/or alternative methodologies can employ additional blocks that are not illustrated.

Computer Embodiment

Figure 5:
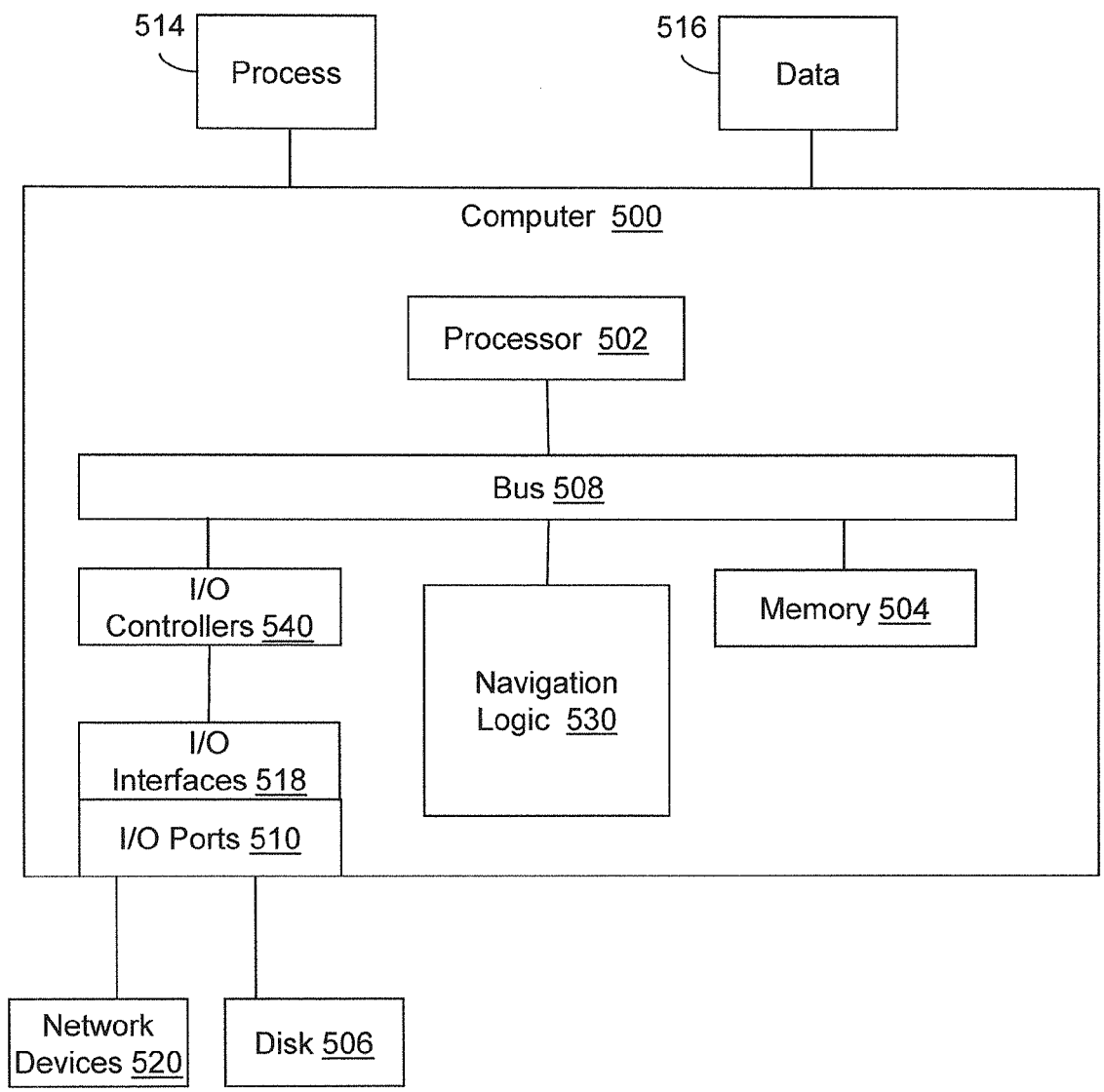
FIG. 5 illustrates an embodiment of a computing system in which example systems and methods, and equivalents, may be implemented.

FIG. 5 illustrates an example computing device in which example systems and methods described herein and/or equivalents, may be implemented and operate. The example computing device is a computer 500 that includes a processor 502, a memory 504, and input/output ports 510 operably connected by a bus 508. In one example, the computer 500 includes navigation logic 530 configured to facilitate tracking navigation paths of a user and suggesting destinations as described with the navigation system 100 of FIG. 1. In different examples, the logic 530 may be implemented in hardware, a non-transitory computer-readable medium with stored instructions, firmware, and/or combinations thereof. Thus in one embodiment, navigation logic 530 defines a program/algorithm that programs the computer 500 to perform specific functions as described. While the logic 530 is illustrated as a programming component in communication with the bus 508, it is to be appreciated that in one example, the logic 530 could be implemented in the processor 502.

In one embodiment, logic 530 is hardware, a non-transitory computer-readable medium with stored instructions, and/or firmware for performing one or more portions of the method 300 of FIG. 3, for example.

Generally describing an example configuration of the computer 500, the processor 502 may be a variety of various processors including dual microprocessor and other multiprocessor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause the computer to perform functions, the computer-executable instructions comprising:
   instructions for providing access to an intranet portal;
   instructions for identifying a user that accesses the intranet portal;
   instructions for, for the user accessing the intranet portal, tracking navigation paths taken by the user within the intranet portal;
   instructions for storing the navigation paths in a user profile associated with the user, wherein the navigation paths are stored to indicate a sequence of visited locations, wherein a navigation path includes a starting location, intermediate locations, and a destination location for the sequence; and
   instructions for, when the user visits a location within the intranet portal, generating a list of suggested destination locations by comparing a current sequence of visited locations with the stored sequences of visited locations to identify matching sequences and returning the destination locations stored in the user profile associated with the matching sequences;
   instructions for transmitting to a device for displaying on a display screen, the generated list of suggested destination locations in addition to webpage content from the location being visited;
   instructions for, in response to a destination location being selected from the generated list, navigating directly to the destination location from the location without navigating through the intermediate locations; and
   instructions for, in response to the user leaving the location and visiting a second location, recalculating the list of suggested destination locations and deleting destination locations that are no longer part of the matching sequences that include the second location, and transmitting the recalculated list of suggested destination locations to the device for display on the display screen.

2. The non-transitory computer-readable medium of claim 1, further comprising instructions for determining the navigation path as a path from a root location in the intranet portal to the visited location including a sequence of visited locations in between.

3. The non-transitory computer-readable medium of claim 1, further comprising instructions for determining the navigation path as a path from a first visited location to a second visited location that has been navigated by the user; and
   wherein the navigation profile is searched to find a corresponding path including the first visited location and the second visited location.

4. The non-transitory computer-readable medium of claim 1, further comprising computer-executable instructions configured for assigning a weight to the navigation paths in the user profile based on a frequency that the user follows a selected path; and ranking the list of suggested destination locations based at least in part on the weight.

5. The non-transitory computer-readable medium of claim 1, further comprising computer-executable instructions configured for changing the list of suggested destination locations upon the user visiting a new location.

6. The non-transitory computer-readable medium of claim 1, further comprising computer-executable instructions configured for storing the navigation paths in the user profile as a tree of paths wherein leaf nodes in the tree represent destination locations from an associated path; and computer-executable instructions configured for, when the user visits the second location within the intranet portal, the deleting of the destination locations that are no longer possible includes pruning the generated list of suggested destination locations by removing leaf nodes that are not part of the tree under the visited location.

7. The non-transitory computer-readable medium of claim 1, further comprising computer-executable instructions configured for displaying the list of suggested destination locations as navigation shortcuts to the suggested destination locations on a display screen; and wherein the navigation shortcuts are links that are not pre-existing webpage content of a webpage of the location being visited by the user.

8. The non-transitory computer-readable medium of claim 1, wherein the intranet portal contains content for a corporate enterprise with access restricted to authorized users.

9. The non-transitory computer-readable medium of claim 1, further comprising computer-executable instructions configured for storing the navigation paths in a user profile associated with the user in a non-transitory storage device.

10. A computing system, comprising:
a processor;
at least one non-transitory computer-readable medium connected to at least the processor by a communication bus;
tracking logic, stored in the at least one non-transitory computer-readable medium, and configured to be executable by the processor to cause the computer system to track navigation paths of a user in an intranet portal and store the navigation paths in a navigation profile for the user, wherein the navigation paths indicate a sequence of visited locations and a destination location for each sequence;
shortcut suggestion logic, stored in the at least one non-transitory computer-readable medium, configured to be executable by the processor to cause the computer system to determine suggested destination locations to the user based on the navigation profile of the user and a current visited path taken by the user in the intranet portal, wherein the suggested destinations are likely destinations based on a current location of the user in the intranet portal;
wherein the shortcut suggestion logic is further configured to
cause the suggested destinations to be displayed on a display screen as navigation shortcuts, wherein the navigation shortcuts are links that are not pre-existing links in webpage content of the current location; and
in response to the user leaving the current location and visiting a second location in the intranet portal, (i) recalculate the suggested destination locations and delete destination locations that are no longer part of the navigation path that includes the second location, and (ii) transmit the recalculated suggested destination locations for display on the display screen;
wherein the tracking logic and the shortcut suggestion logic are implemented having at least stored instructions for execution by the processor.

11. The computing system of claim 10, wherein the navigation path is determined as a path from a first visited location to a second visited location that has been navigated by the user; and
wherein the shortcut suggestion logic is configured to search the navigation profile of the user to find a corresponding path including the first visited location and the second visited location, where the corresponding path includes other visited locations that lead to the destination location of the path.

12. The computing system of claim 10, wherein the shortcut suggestion logic is configured to generate the navigation shortcut as a direct link to an associated destination location.

13. The computing system of claim 10, wherein the tracking logic is configured to store the navigation paths in the navigation profile for a user as a tree of paths wherein leaf nodes in the tree represent destination locations from an associated path; and
wherein when the user visits a location within the intranet portal, the shortcut suggestion logic is configured to prune the generated list of suggested destination locations by removing leaf nodes that are not part of the tree under the visited location.

14. The computing system of claim 10, wherein shortcut suggestion logic configured to recalculate the suggested destination locations for display when the user moves to the second location in the intranet portal based on matching navigation paths from the navigation profile.

15. A computer-implemented method performed by a computer including at least one processor, the method comprising:
for individual users, maintaining a stored navigation profile corresponding to a user wherein the navigation profile includes a history of navigation paths taken by the user within an intranet portal of the computer for accessing an intranet, wherein the navigation paths indicate a sequence of visited locations in the intranet that include a starting location, one or more intermediate locations, and a destination location for each sequence;
identifying, by at least the processor by verifying input identification information, a user that accesses the intranet portal and identifying the navigation profile corresponding to the identified user;
tracking, by at least the processor, a visited link path followed by the user in the intranet portal and, for a visited location, comparing the visited link path to the navigation paths stored in the navigation profile to identify a matching path;
based on the matching path in the navigation profile, determining and generating, by at least the processor, destination locations in computerized form that belong to the matching path and transmitting to a device for displaying on a display, the destination locations to the user as a suggested list of likely destinations from the visited location,
wherein the destination locations are displayed as navigation shortcuts that are not pre-existing links in content of the visited location;
in response to a destination location being selected from the displayed list, navigating directly to the destination location from the visited location without navigating through the intermediate locations, wherein the navigating is performed with network communications in the intranet; and
in response to the user leaving the visited location and visiting a second location in the intranet portal, (i) recalculating the suggested list of likely destinations and deleting one or more destination locations from the suggested list that no longer belong to the matching path that includes the second location, and (ii) transmitting and displaying the recalculated suggested list of likely destinations on the display screen.

16. The method of claim 15, further comprising determining, by at least the processor, the visited link path as a path from a root location in the intranet portal to the visited location including a sequence of visited locations in between.

17. The method of claim 15, further comprising determining the visited link path as a path from a first visited location to a second visited location that has been navigated by the user; and wherein the navigation profile is searched, by at least the processor, to find a corresponding path including the first visited location and the second visited location.

18. The method of claim 15, further comprising assigning a weight to the navigation paths stored in the navigation profile based on a frequency that the user follows each navigation path; and instructions for displaying the suggested list of likely destinations as a ranked list according to the assigned weight.

19. The method of claim 15, further comprising providing access to the intranet portal.

20. The method of claim 15, further comprising storing, by at least the processor, the navigation profiles for each user in a non-transitory computer-readable medium, wherein the sequence of visited locations for each stored navigation path in a navigation profile includes a starting location visited by the user, intermediate visited locations, and a destination location for the sequence.

* * * * *